United States Patent
Ishii

(10) Patent No.: US 9,374,571 B2
(45) Date of Patent: Jun. 21, 2016

(54) IMAGE PROCESSING DEVICE, IMAGING DEVICE, AND IMAGE PROCESSING METHOD

(71) Applicant: Panasonic Corporation, Osaka (JP)

(72) Inventor: Yasunori Ishii, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 435 days.

(21) Appl. No.: 13/981,722

(22) PCT Filed: Oct. 5, 2012

(86) PCT No.: PCT/JP2012/006420
§ 371 (c)(1),
(2) Date: Jul. 25, 2013

(87) PCT Pub. No.: WO2013/054499
PCT Pub. Date: Apr. 18, 2013

(65) Prior Publication Data
US 2014/0049612 A1 Feb. 20, 2014

(30) Foreign Application Priority Data
Oct. 11, 2011 (JP) .................................. 2011-223735

(51) Int. Cl.
*H04N 13/02* (2006.01)
*G01B 11/00* (2006.01)
(Continued)

(52) U.S. Cl.
CPC ............ *H04N 13/0271* (2013.01); *G01B 11/00* (2013.01); *G01B 11/22* (2013.01);
(Continued)

(58) Field of Classification Search
CPC ................... G01B 11/00; G01B 11/22; G06T 2207/10021; G06T 2207/10024; G06T 2207/20008; G06T 7/0075; H04N 13/0271
USPC ................... 348/42, 43, 46–48; 382/154, 294
See application file for complete search history.

(56) References Cited

U.S. PATENT DOCUMENTS 6,163,337 A * 12/2000 Azuma ................. G06T 7/0022
348/43

(Continued)

FOREIGN PATENT DOCUMENTS

JP 2003-187261 7/2003
JP 2003-269917 9/2003
(Continued)

OTHER PUBLICATIONS

International Search Report issued Nov. 20, 2012 in International Application No. PCT/JP2012/006420.
(Continued)

*Primary Examiner* — Thai Tran
*Assistant Examiner* — Stephen Smith
(74) *Attorney, Agent, or Firm* — Wenderoth, Lind & Ponack, L.L.P.

(57) ABSTRACT

An image processing device which creates a depth map using a multi-view image includes: a detection unit which detects at least one feature in each of images included in the multi-view image; a calculation unit which calculates reliability of correspondence between the images included in the multi-view image in preparation for creating the depth map; and a creation unit which creates the depth map using the correspondence between the images included in the multi-view image when the calculated reliability is a first reliability, and creates the depth map without using the correspondence between the images included in the multi-view image when the calculated reliability is a second reliability which is lower than the first reliability.

12 Claims, 9 Drawing Sheets

(51) Int. Cl.
*G01B 11/22* (2006.01)
*G06T 7/00* (2006.01)

(52) U.S. Cl.
CPC .... *G06T 7/0075* (2013.01); *G06T 2207/10021* (2013.01); *G06T 2207/10024* (2013.01); *G06T 2207/20008* (2013.01)

(56) References Cited

U.S. PATENT DOCUMENTS

| | | | | |
|---|---|---|---|---|
| 6,487,304 | B1* | 11/2002 | Szeliski | G06K 9/20 382/107 |
| 6,606,406 | B1* | 8/2003 | Zhang | G06K 9/00201 345/422 |
| 8,442,307 | B1* | 5/2013 | Anati | G06T 7/0038 382/154 |
| 2005/0100207 | A1* | 5/2005 | Konolige | G06T 7/0071 382/154 |
| 2005/0129305 | A1* | 6/2005 | Chen | G06K 9/20 382/154 |
| 2006/0029272 | A1* | 2/2006 | Ogawa | G06K 9/32 382/154 |
| 2007/0236561 | A1* | 10/2007 | Anai | G06T 7/0044 348/46 |
| 2007/0263924 | A1* | 11/2007 | Kochi | G01B 11/24 382/154 |
| 2009/0141967 | A1 | 6/2009 | Hattori | |
| 2010/0232709 | A1* | 9/2010 | Zhang | G06T 7/0048 382/201 |
| 2010/0246896 | A1* | 9/2010 | Saito | G06K 9/00798 382/106 |
| 2011/0128353 | A1* | 6/2011 | Leung | H04N 19/597 348/47 |
| 2011/0142138 | A1* | 6/2011 | Tian | H04N 13/0022 375/240.24 |
| 2011/0216948 | A1* | 9/2011 | Yalla | G06K 9/0006 382/125 |
| 2011/0235899 | A1* | 9/2011 | Tanaka | G06T 7/0028 382/154 |
| 2011/0292178 | A1* | 12/2011 | Goma | H04N 13/0022 348/46 |
| 2011/0293172 | A1* | 12/2011 | Sakamoto | H04N 13/0033 382/154 |
| 2011/0299761 | A1* | 12/2011 | Myokan | G01B 11/26 382/154 |
| 2012/0039525 | A1* | 2/2012 | Tian | G06T 5/005 382/154 |
| 2012/0249751 | A1* | 10/2012 | Zhang | G06T 7/002 348/47 |
| 2012/0293624 | A1* | 11/2012 | Chen | H04N 13/0022 348/46 |
| 2012/0321172 | A1* | 12/2012 | Jachalsky | G06T 7/0075 382/154 |
| 2013/0057644 | A1* | 3/2013 | Stefanoski | G06T 5/50 348/42 |
| 2013/0070050 | A1* | 3/2013 | Ha | H04N 5/144 348/43 |
| 2013/0071009 | A1* | 3/2013 | Ha | G06T 7/0022 382/154 |
| 2015/0304634 | A1* | 10/2015 | Karvounis | H04N 13/0239 348/46 |

FOREIGN PATENT DOCUMENTS

| | | |
|---|---|---|
| JP | 2004-86266 | 3/2004 |
| JP | 2005-242488 | 9/2005 |
| JP | 2009-133753 | 6/2009 |
| JP | 2010/128608 | 6/2010 |
| JP | 2010-128622 | 6/2010 |
| JP | 2011-182325 | 9/2011 |

OTHER PUBLICATIONS

Mikio Takagi et al., "Shinpen Gazo Kaiseki Handobukku", University of Tokyo Press, Sep. 2004, pp. 1289-1435 with partial English translation.

Yuri Boykov et al., "An Experimental Comparison of Min-Cut/Max-Flow Algorithms for Energy Minimization in Vision", IEEE Transactions on Pattern Analysis and Machine Intelligence (PAMI), vol. 26, No. 9, p. 1124-1137, Sep. 2004.

David G. Lowe, "Object Recognition from Local Scale-Invariant Features", Proceedings of the International Conference on Computer Vision (ICCV), Sep. 1999.

David G. Lowe, "Distinctive Image Features from Scale-Invariant Keypoints", International Journal of Computer Vision, vol. 60, No. 2, Nov. 2004, p. 91-110.

Eri Ueda et al., "Software Development of Disparity Maps and 2D3D Transformation", ITE Technical Report, Oct. 15, 2010, vol. 34, No. 43, pp. 49 to 52 (with partial English translation).

Hisato Kawaji et al., "Image-based Indoor localization of Visitors using Time Variation", IEICE Technical Report, PRMU Pattern Ninshiki; Media Rikai, Jan. 13, 2011, vol. 110, No. 381, pp. 291 to 296.

* cited by examiner

IMAGE PROCESSING DEVICE, IMAGING DEVICE, AND IMAGE PROCESSING METHOD

TECHNICAL FIELD

The present invention relates to a technique for creating a depth map using a multi-view image.

BACKGROUND ART

In recent years, there have been remarkable advances in functionality and capability of digital still cameras and digital camcorders provided with a solid-state imaging device (hereinafter also referred to as an "imaging device") such as a charge coupled device (CCD) image sensor or a complementary metal oxide semiconductor (CMOS) image sensor. In particular, advances in semiconductor process technology have been providing solid-state imaging devices with finer pixel structure. Consequently, density of integrated pixels and driver circuits of solid-state imaging devices has been further increased. In these few years, the number of pixels in an imaging device soared from one million to over ten million. Furthermore, quality of images captured using an imaging device has been significantly increased.

On the other hand, display devices such as thin liquid crystal displays and plasma displays have been in the market. Liquid crystal displays and plasma displays are space-saving devices and capable of displaying high-resolution and high-contrast images, achieving high performance. Such increase in image quality has been spreading from two-dimensional images to three-dimensional images. Recently, three-dimensional display devices have been under development which show high-quality three-dimensional images to viewers wearing polarized glasses.

One of major three-dimensional imaging techniques is to use an imaging system including two cameras to obtain a stereogram (a set of a left image and a right image). Stereograms thus obtained are used in proposed methods of creating a depth map for a captured scene. For example, a pixel in a left image and a pixel in a right image are paired when the pixels show an image of the same object. Then, using displacement (disparity) between the positions of the paired pixels, the distance (depth) from the camera to the object is measured by use of the principle of triangulation to create a depth map.

A depth map thus created is used for adjustment of depth feel or blurring according to depth of three-dimensional images. For example, a three-dimensional image can be blurred to give a larger amount of blur to a region more distant.

CITATION LIST

Patent Literature

[PTL 1] Japanese Unexamined Patent Application Publication No. 2010-128608
[PTL 2] Japanese Unexamined Patent Application Publication No. 2010-128622
[PTL 3] Japanese Unexamined Patent Application Publication No. 2003-187261

Non Patent Literature

[NPL 1] "Shinpen Lazo Kaiseki Handobukku", supervised by Mikio Takagi and Haruhisa Shimoda, University of Tokyo Press, September 2004, pp. 1289-1435
[NPL 2] "An Experimental Comparison of Min-Cut/Max-Flow Algorithms for Energy Minimization in Vision" (2004), Yuri Boykov, Vladimir Kolmogorov, IEEE Transactions on Pattern Analysis and Machine Intelligence
[NFL 3] David G. Lowe, "Object recognition from local scale-invariant features", ICCV 1999
[NFL 4] David G. Lowe, "Distinctive Image Features from Scale-Invariant Keypoints", International Journal of Computer Vision, 60, 2, pp. 91-110, 2004

Technical Problem

However, use of the conventional method may result in a significant decrease in accuracy of a depth map because of failure in depth measurement.

SUMMARY OF INVENTION

In view of this, the present invention is conceived to provide an image processing device capable of preventing such significant deterioration in accuracy of a depth map created using a multi-view image.

Solution to Problem

An image processing device according to an aspect of the present invention which creates a depth map using a multi-view image includes: a detection unit configured to detect one or more features in each of images included in the multi-view image; a calculation unit configured to calculate, based on the detected features, reliability of a correspondence between the images included in the multi-view image in preparation for creating the depth map; and a creation unit configured to create the depth map using the correspondence between the images included in the multi-view image when the calculated reliability is a first reliability, and create the depth map without using the correspondence between the images included in the multi-view image when the calculated reliability is a second reliability which is lower than the first reliability.

The general or specific aspect may be implemented using a system, a method, an integrated circuit, a computer program, or a computer-readable recording medium such as a CD-ROM, or any combination of systems, methods, integrated circuits, computer programs, or computer-readable recording media.

Advantageous Effects of Invention

An image processing device according to an aspect of the present invention is capable of preventing a significant decrease in accuracy of a depth map created using a multi-view image.

Figure 1:
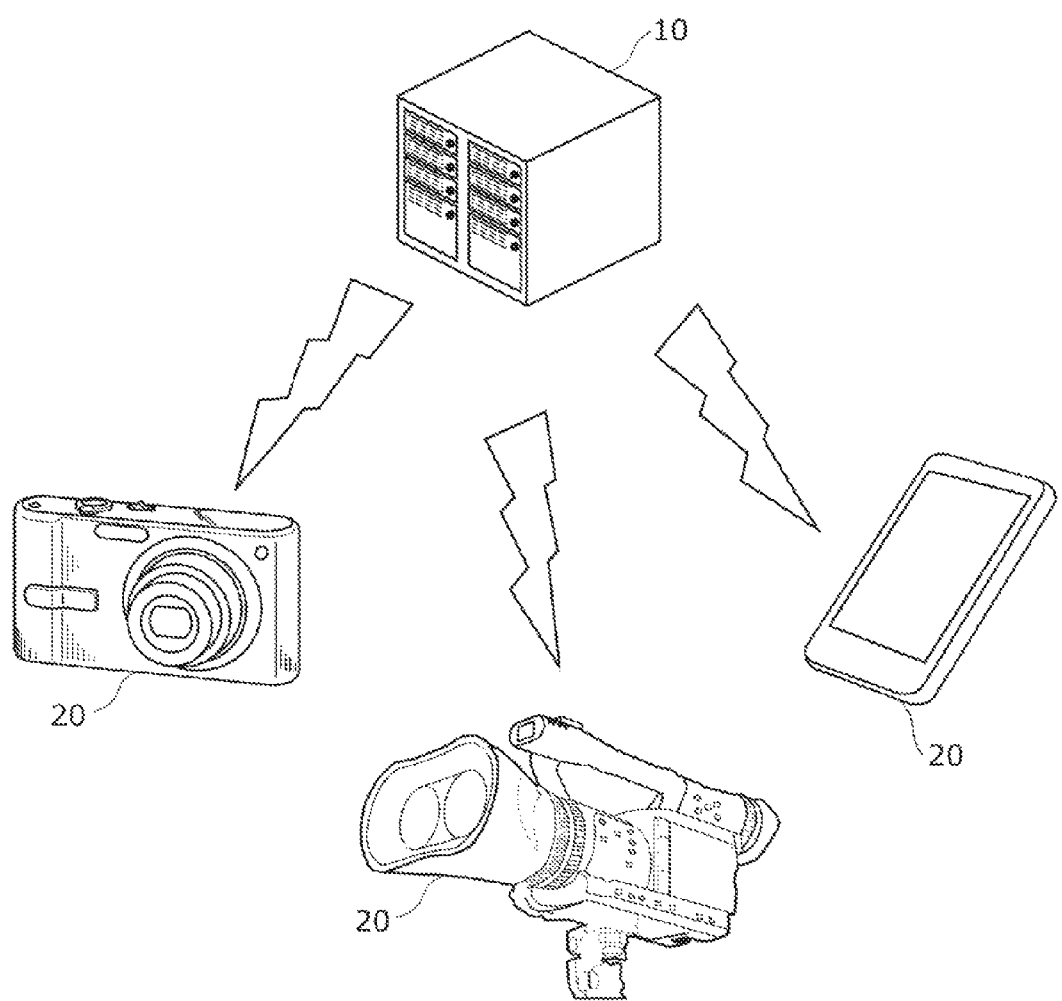
FIG. 1 illustrates a configuration of an image processing system according to Embodiment 1.

DESCRIPTION OF EMBODIMENTS (Underlying Knowledge Forming Basis of the Present Invention)

Patent Literature (PTL) 1 and PTL 2 disclose a method of pairing a pixel in a left image and a pixel in a right image which show the same object using similarity between local regions in the respective left image and light image. In this method, a pixel in a left image and a pixel in a right image showing the same object are paired by shifting a correlation window (local region) in the right image to locate a position of the correlation window where the pattern of pixel values in the correlation window has the highest similarity with the pattern of pixel values in a correlation window set in the left image.

PTL 3 discloses a method of pairing a pixel in a left image and a pixel in a right image which show the same object by global optimization typified by graph cuts. In this method, a pixel in a left image and a pixel in a right image which show the same object are paired based on similarity between local regions in the respective left image and right image and smoothness of change in parallax (spatial smoothness of disparity distribution) between adjacent pixels in a depth map. More specifically, the depth map is created by calculating disparity which minimizes an energy function defined by a data term representing similarity between local regions and a smoothing term representing spatial smoothness of parallax distribution. In graph cuts, each pixel is handled as a graph structure and energy calculated from the data term and the smoothing term is set as a weight between nodes in the graph. Then, by solving a max-flow problem on the graph, a disparity map for energy minimization can be obtained. A method of solving the max-flow problem is disclosed in Non Patent Literature (NPL) 2.

However, when a left image and a right image have few features, it is difficult to pair a pixel in the left image and a pixel in the right image which show the same object, using the above-described method. For example, when a scene filled with a smooth view or a scene with extremely small texture representation (for example, a scene of an indoor wall or the sky) is shot, a large part of the image is occupied by a smooth region. Furthermore, when a camera or an object moves by a long distance, a large part of the image blurs due to a camera shake or a motion blur. It is difficult to pair, based on similarity between local regions, a pixel in a left image and a pixel in a right image which show the same object.

As a result, it is more likely that a pixel in a left image and a pixel in a right image which show different objects are paired. When disparity calculated based on such a pair of pixels showing different objects is used, accuracy of a resulting depth map significantly deteriorates.

In view of this, provided is an image processing device according to an aspect of the present invention which creates a depth map using a multi-view image and includes: a detection unit configured to detect one or more features in each of images included in the multi-view image; a calculation unit configured to calculate, based on the detected features, reliability of a correspondence between the images included in the multi-view image in preparation for creating the depth map; and a creation unit configured to create the depth map using the correspondence between the images included in the multi-view image when the calculated reliability is a first reliability, and create the depth map without using the correspondence between the images included in the multi-view image when the calculated reliability is a second reliability which is lower than the first reliability.

In this configuration, whether to use a correspondence between images included in a multi-view image for creating a depth map can be determined according to reliability calculated based on features. Reliability of a correspondence between images depends on features. For example, it is difficult to obtain a correct correspondence from images filled with a smooth region and having no detectable feature. Whether to use such a correspondence between images included in a multi-view image according to reliability calculated based on features for creating a depth map is determined according to the reliability thus calculated, so that fewer depth maps are created using incorrect correspondence. This will prevent significant deterioration in accuracy of a resulting depth map.

For example, the image processing device may further include a derivation unit configured to derive, as corresponding points, a pair of the features corresponding to each other between the images included in the multi-view image, wherein the calculation unit is configured to calculate the reliability based on the corresponding points.

In this configuration, reliability can be calculated based on corresponding points. Reliability of a correspondence between images depends on accuracy of corresponding points, and therefore calculated reliability is more appropriate. This will prevent significant deterioration in accuracy of a depth map.

For example, the image processing device may further include a transformation unit configured to calculate, using at least four of the derived corresponding points, a transformation parameter for projective transformation of a first image included in the multi-view image into a second image included in the multi-view image, and transform the first image using the transformation parameter, wherein the calculation unit may be configured to calculate the reliability which is higher when an error of the first image resulting from the projective transformation with respect to the second image is smaller.

In this configuration, a transformation parameter for performing projective transformation of a first image into a second image can be calculated using at least four corresponding points. Then, reliability can be calculated based on an error of the first image resulting from the projective transformation performed using the transformation parameters thus calculated. The error is an error with respect to the second image. When derived corresponding points are correct, the error of the resulting first image with respect to the second image is small. Thus, calculated reliability is more appropriate, so that significant deterioration in accuracy of a depth map is prevented.

For example, the transformation unit may be configured to calculate plural transformation parameters using plural combinations of M corresponding points selected from among N of the derived Corresponding points, and transform the first image into plural first images resulting from the projective transformation using the plural transformation parameters, where $N \geq 5$ and $4 \leq M < N$, the combinations being different from each other, and the calculation unit is configured to calculate, as the error, one of a root mean square, an average absolute value, a square sum, and a sum of absolute values of differences between the plural transformed first images and the second image, and calculate the reliability which is higher when the error is smaller.

In this configuration, plural first images can be obtained using a plural combination of M corresponding points. Then, reliability can be calculated based the plural first images resulting from transformation. Thus, reliability can be stably calculated, so that significant deterioration in accuracy of a depth map is further prevented.

For example, the detection unit may be configured to detect an edge as the feature, and the calculation unit may be configured to calculate the error of the first image resulting from the projective transformation with respect to the second image, only from a region where the detected edge has a strength above a threshold value in the second image.

In this configuration, an error is calculated only from a region including a strong edge. A correspondence between images can be obtained more easily in such a region including a strong edge. Accordingly, reliability can be calculated for a region for which unfailing obtainment of a correspondence is desired, even with a smaller load.

For example, the calculation unit may be configured to calculate the reliability which is higher when the features detected in each of the images included in the multi-view image are more.

In this configuration, reliability can be calculated based on the number of features. Detection of a larger number of features means that the image has more features. Accordingly, when reliability is calculated to be higher for more features, the reliability calculation can be performed appropriately and easily.

For example, the calculation unit may be configured to calculate the reliability which is higher when a center of distribution of the features detected in each of the images included in the multi-view image is closer to a center of the image.

In this configuration, reliability can be calculated so that the calculated reliability is higher when the center of distribution of the features is closer to the center of the image. A region closer to the edge of an image is more likely to be affected by noise due to disturbance, such as lens distortion. Thus, when features are uniformly distributed over an image, and the centroid of the set of the features is closer to the center of the image, the features can be considered to be located at positions where the features are, on average, less likely to be affected by disturbance. Accordingly, when reliability is calculated to be higher for a shorter distance between the center of distribution of the features and the center of the image, the reliability calculation can be performed appropriately and easily.

For example, the detection unit may be configured to detect, as the feature, an edge in each of the images included in the multi-view image, and the calculation unit may be configured to calculate the reliability which is higher when the edge detected in each of the images included in the multi-view image is stronger.

In this configuration, reliability can be calculated based on the strength of an edge. Detection of a stronger edge means that the image has more features. Accordingly, when reliability is calculated to be higher for a stronger edge, the reliability calculation can be performed appropriately and easily.

For example, when the calculated reliability is the first reliability, the creation unit may be configured to create the depth map by calculating disparity between the images included in the multi-view image, based on similarity between local regions.

In this configuration, when reliability is high, an accurate depth map can be created by calculating disparity based on similarity between local regions.

For example, when the calculated reliability is the second reliability, the creation unit may be configured to create the depth map by estimating depth using at least one of geometric information, color information, or information on a motion of an object in one of the images included in the multi-view image.

In this configuration, when reliability is low, a depth map can be created by estimating depth from a single image. Accordingly, creating a depth map using inaccurate correspondence between images can be avoided, so that significant deterioration in accuracy of a depth map is prevented.

For example, the multi-view image is included in a multi-view video, and when the calculated reliability is the second reliability, the creation unit may be configured to create the depth map for the multi-view image using a depth map created using an other multi-view image which is included in the multi-view video and temporally different from the multi-view image.

In this configuration, when reliability is low, a depth map can be created by using a depth map created using another mufti-view image. Accordingly, it is possible to prevent occurrence of an acute change between depth maps over different time points, so that the created depth map are more appropriate.

For example, when the calculated reliability is the second reliability, the creation unit may be configured to create the depth map using both a depth map created using a correspondence between local regions in the other multi-view image and depth estimated using at least one of geometric information, color information, or information on a motion of an object in one of the images included in the multi-view image.

In this configuration, when reliability is low, a depth map can be created by using both a depth map created using another multi-view image and depth estimated from a current multi-view image. Accordingly, it is possible to increase accuracy of a depth map created without using a correspondence between plural images.

For example, when the calculated reliability is the second reliability, the creation unit may be configured to use, as the depth map for the multi-view image, a depth map created using a correspondence between local regions in the other multi-view image.

In this configuration, when reliability is low, a depth reap can be created by using, as a depth map for a current multi-view image, a depth map created using another multi-view image. Accordingly, a depth map can be created more easily.

For example, the multi-view image may be a stereogram, the image processing device may further include a transformation unit configured to rectify the stereogram to parallelize epipolar lines in the stereogram, and when the calculated reliability is the first reliability, the calculation unit may be configured to create the depth map using a correspondence in the rectified stereogram.

In this configuration, a stereogram can be rectified. Accordingly, a correspondence in a stereogram can be derived by searching in a horizontal direction, so that processing load is reduced.

Furthermore, an imaging device according to an aspect of the present invention includes: any one of the above-described image processing devices; and an imaging unit configured to capture the multi-view image.

This configuration will produce the same advantageous effect as that of the image processing device.

The general or specific aspect may be implemented using a system, a method, an integrated circuit, a computer program, or a computer-readable recording medium such as a CD-ROM, or any combination of systems, methods, integrated circuits, computer programs, or computer-readable recording media.

Hereinafter, embodiments will be concretely described with reference to the drawings.

It should be noted that the embodiments given below are each described as a general or specific example. The numerical values shapes, materials, constituent elements, the arrangement and connection of constituent elements, steps, the processing order of the steps etc. shown in the following exemplary embodiments are mere examples, and therefore do not limit the scope of claims. Therefore, among the constituent elements in the following exemplary embodiments, constituent elements not recited in any one of the independent claims are described as optional constituent elements.

It should also be noted that details may not be discussed below beyond a necessary extent. For example, details of well-known things or repetitive description of a substantially identical configuration may not be discussed. This is for the purpose of avoiding providing a redundant description and enabling the description to be understood easily by those skilled in the art.

It should also be noted that in the present description, a signal indicating an image or information indicating an image may be simply referred to as an "image".

Embodiment 1

FIG. 1 illustrates a configuration of an image processing system according to Embodiment 1. The image processing system includes an image processing device 10 and an imaging device 20.

The image processing device 10 is, for example, a server connected to a network. The image processing device 10 receives a multi-view image from the imaging device 20. The image processing device 10 is not limited to a single server machine but may be implemented as cloud servers.

The imaging device 20 is, for example, a digital still camera, a digital camcorder, or a mobile phone with a built-in camera. The imaging device 20 captures a multi-view image.

A multi-view image includes a plurality of image of a substantially identical scene viewed from different points. Examples of a multi-view image include a stereogram including a left image and a right image. The multi-view image is not limited to a stereogram. For example, the multi-view image may include four images of a left image, a right image, an upper image, and a lower image.

(Functional Configuration of Image Processing Device)

Figure 2:
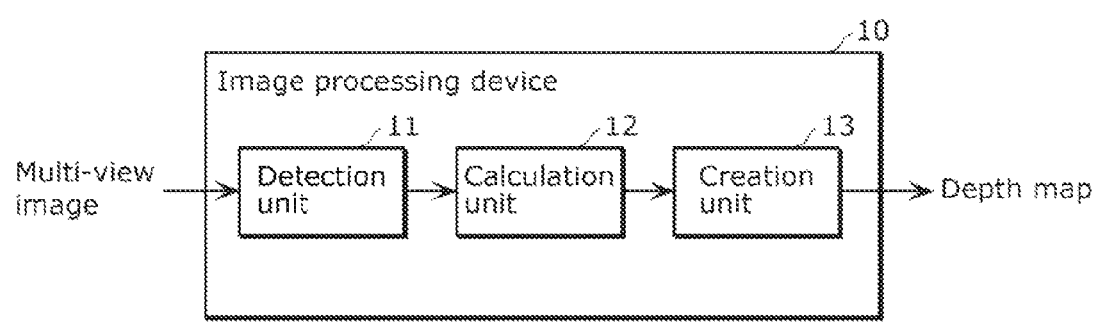
FIG. 2 is a block diagram illustrating a functional configuration of the image processing device according to Embodiment 1.

FIG. 2 is a block diagram illustrating a functional configuration of the image processing device 10 according to Embodiment 1. The imaging device 10 creates a depth map using a multi-view image.

A depth map is information on depth in a captured scene. For example, a depth map is an image having values representing depths as pixel values. The depth map may have a value representing a depth not for each pixel but for each block composed of a plurality of pixels.

The value representing a depth is, for example, a value representing a distance from a camera to an object. The value representing a depth need not be such a value representing a distance from a camera to an object. For example, the value representing a depth may be a value representing a distance from a reference plane to an object. For example, the value representing a depth may be a value representing a disparity between images in a multi-view image.

As shown in FIG. 2, the image processing device 10 includes a detection unit 11, a calculation unit 12, and a creation unit 13. These units will be described below in detail.

The detection unit 11 detects at least one feature from each image included in a multi-view image. More specifically, the detection unit 11 detects at least one feature in each image included in a multi-view image by performing edge detection or corner detection, for example.

In preparation for creating a depth map, the calculation unit 12 calculates, based on the detected features, reliability of a correspondence between images included in a multi-view image. A higher reliability indicates a higher probability that a depth map to be created using a correspondence between the images included in the multi-view image is accurate. The correspondence between images means a correlation between local regions (for example, between pixels or between sets of pixels) of respective images.

More specifically, reliability calculate by the calculation unit 12 is higher when a larger number of features are detected from each image included in a multi-view image. Detection of a larger number of features means that the image has more features. Accordingly, the calculation unit 12 calculates reliability so that the reliability calculated for more features is higher. Calculation of reliability in this manner can be thus performed appropriately and easily.

Optionally, reliability calculated by the calculation unit 12 may be higher when a feature detected in each image included in a multi-view image is closer to the center of the image. A region closer to the edge of an image is more likely to be affected by noise due to disturbance, such as lens distortion. Thus, when features are uniformly distributed over an image, and the centroid of the set of the features is closer to the center of the image, the features can be considered to be located at positions where the features are, on average, less likely to be affected by disturbance. Accordingly, the calculation unit 12 calculates reliability so that the reliability calculated for a closer center of distribution of features is higher. Calculation of reliability in this manner can be thus performed appropriately and easily.

Optionally, reliability calculated by the calculation unit 12 may be higher when the detection unit 11 detects edges and the edge detected in each image included in a multi-view image has a higher strength. The calculation unit 12 thus appropriately calculates reliability with easy. Detection of a stronger edge means that the image has more features.

The creation unit 13 creates a depth map for a scene in a multi-view image based on the calculated reliability. The creation unit 13 switches methods of creating a depth map according to the calculated reliability.

More specifically, when the calculated reliability is a first reliability, the creation unit 13 creates a depth map using a correspondence between images included in a multi-view image. For example, the creation unit 13 calculates disparity between images included in a multi-view image by performing matching between the images. More specifically, the creation unit 13 calculates disparity between images included in a multi-view image by searching the images for similar local regions in the respective images. Then, the creation unit 13 creates a depth map by calculating depth corresponding to the disparity between the images.

When the calculated reliability is a second reliability which is lower than the first reliability, the creation unit 13 creates a depth map without using a correspondence between images included in a multi-view image. For example, the creation unit 13 creates a depth map by estimating depth from one of images included in a multi-view image. In other words, the creation unit 13 creates a depth map without performing matching between images included in a multi-view image.

(Processing Operations of Image Processing Device)

Figure 3:
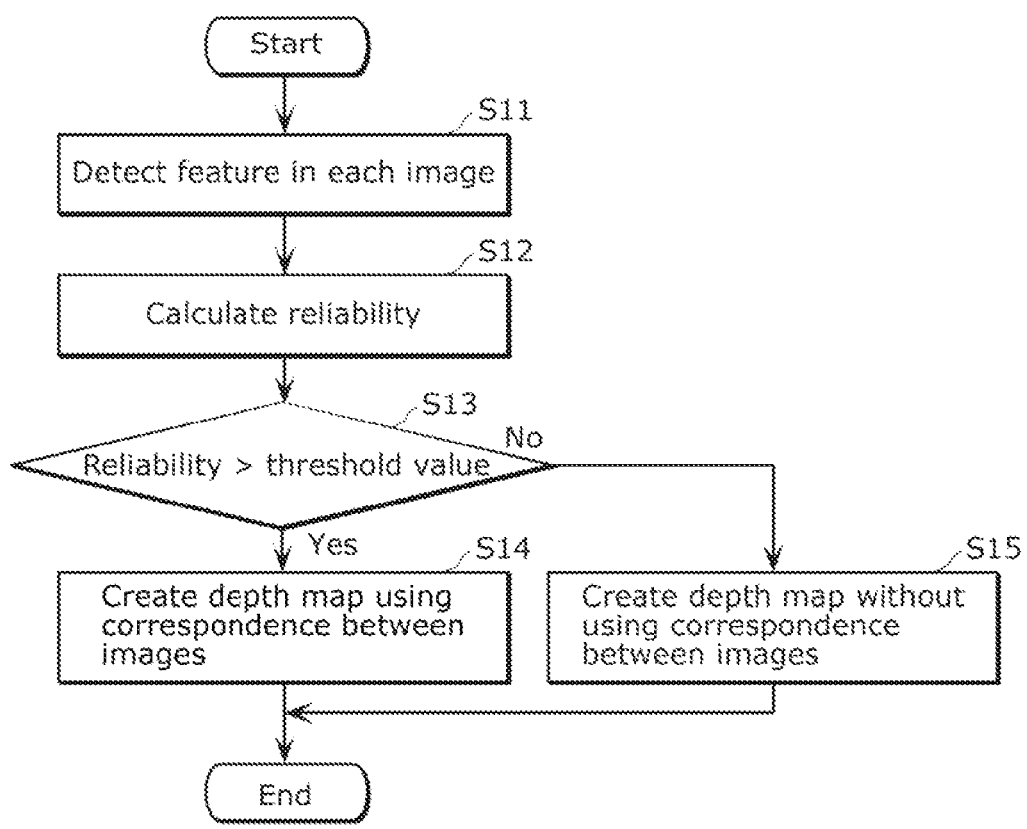
FIG. 3 is a flowchart illustrating processing operations of the image processing device in Embodiment 1.

Hereinafter, operations of the image processing device 10 in the above-described configuration will be described. FIG. 3 is a flowchart illustrating processing operations of the image processing device 10 in Embodiment 1.

First, the detection unit 11 detects at least one feature in each image included in a multi-view image (S11). Next, the calculation unit 12 calculates reliability based on the features (S12). Next, the creation unit 13 compares the reliability with a threshold value (S13). The threshold value indicates a reliability level which is used as a criterion for determining whether or not to create a depth map using a correspondence between images.

When the reliability is above the threshold value (S13, Yes), the creation unit 13 creates a depth map using a correspondence between the images included in the multi-view image (S14). More specifically, when the reliability calculated in Step S12 is a first reliability which is higher that the threshold value, the creation unit 13 creates a depth map using a correspondence between the images included in the multi-view image.

When the reliability is not above the threshold value (S13, No), the creation unit 13 creates a depth map without using a correspondence between the images included in the multi-view image (S15). More specifically, when the reliability calculated in Step S12 is a second reliability which is lower than or equal to the threshold value (that is, lower than the first reliability), the creation unit 13 creates a depth map without using a correspondence between the images included in the multi-view image.

As described above, the image processing device 10 according to Embodiment 1 may create a depth map using a correspondence between images included in a multi-view image or may be created without using such a correspondence. Whether or not the image processing device 10 uses a correspondence for creating a depth map is determined according to reliability calculated based on features. Reliability of a correspondence between images depends on features. For example, it is difficult to obtain a correct correspondence from images filled with a smooth region and having no detectable feature. The image processing device 10 avoids creating a depth map using an incorrect correspondence by creating a depth map based on a determination, according to reliability calculated based on features, as to whether or not a correspondence is used for creating the depth map. As a result, the image processing device 10 will prevent significant deterioration in accuracy of a depth map.

Embodiment 2

The following describes Embodiment 2. In Embodiment 2, an imaging device functions as an image processing device.

(Overall Configuration of Imaging Device)

Figure 4:
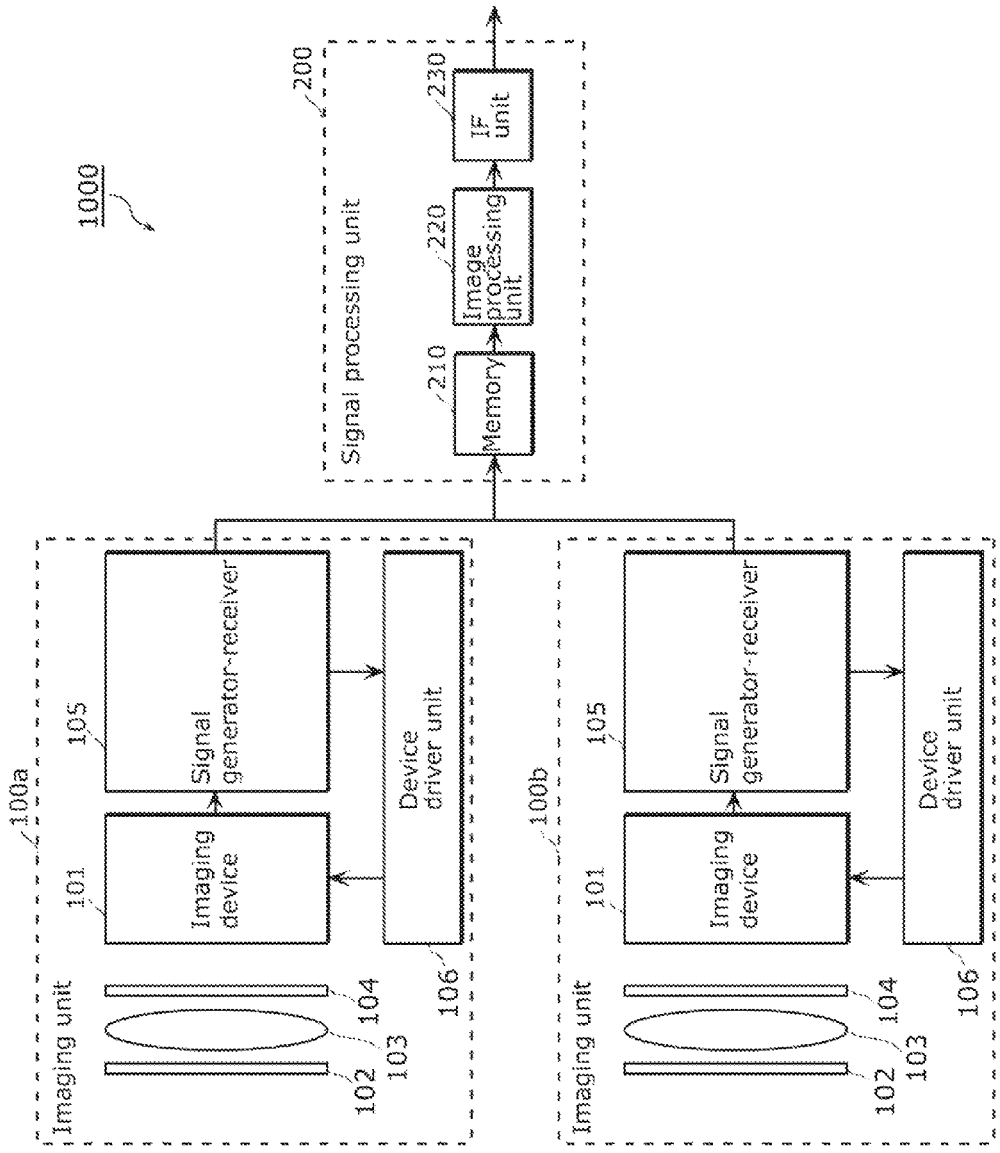
FIG. 4 illustrates a configuration of an imaging device according to Embodiment 2.

FIG. 4 illustrates a configuration of an imaging device 1000 according to Embodiment 2. The imaging device 1000 according to Embodiment 2 is, for example, a digital electronic camera. The imaging device 1000 includes an imaging unit 100a, an imaging unit 100b, and a signal processing unit 200.

The imaging unit 100a and the imaging unit 100b each capture an image of the same scene from a different viewpoint to create a stereogram. The imaging unit 100a and the imaging unit 100b are spaced apart from each other by, for example, a human interocular distance (approximately 6.5 centimeters). Alternatively, when the imaging device 1000 needs to be placed in a small space, the imaging unit 100a and the imaging unit 100b may be spaced apart by a distance shorter than the human interocular distance.

As shown in FIG. 4, the imaging unit 100a and the imaging unit 100b each include an imaging device 101, a light-transmissive plate 102, an optical lens 103, an infrared cut filter 104, a signal generator-receiver 105, and a device driver unit 106.

The imaging device 10 is, for example, a solid-state imaging device such as a CCD image sensor or a CMOS image sensor. The imaging device 101 converts an optical image formed by the light-transmissive plate 102, the optical lens 103, and the infrared cut filter 104 into an electric signal.

The size or resolution of the imaging device 101 may be determined as appropriate for intended shooting. For example, a low-resolution imaging device with a large pixel pitch (or a large-size pixel) is suitable for shooting in a dark environment such as a night scene. With this, the imaging device 1000 is capable of capturing a light image of an object.

The light-transmissive plate 102 is a protective cover of the optical lens 103.

The optical lens 103 forms, from light from an object, an image onto an imaging surface of the imaging device 101. The infrared cut filter 104 transmits visible light and cuts near-infrared light.

The signal generator-receiver 105 generates a base signal for driving the imaging device 101. Furthermore, the signal generator-receiver 105 receives a signal output from the imaging device 101 and transmits the signal to the signal processing unit 200.

The device driver unit 106 drives the imaging device 101 according to the base signal generated by the signal generator-receiver 105. The signal generator-receiver 105 and the device driver unit 106 are, for example, LSIs such as a CCD driver.

The signal processing unit 200 includes memory 210, an image processing unit 220, and an interface (IF) unit 230.

The memory 210 is, for example, a volatile memory such as a dynamic random access memory (DRAM). The memory 210 stores various types of data for use in image processing. For example, the memory 210 temporarily stores signals output from the imaging unit 100a and the imaging unit 100b.

The image processing unit 220 generates a stereogram by processing signals output from the imaging unit 100a and the imaging unit 100b. Furthermore, the image processing unit 220 generates a depth map from a stereogram. Then, the image processing unit 220 outputs image data including the stereogram and a depth map to the interface unit 230.

The image processing unit 220 may be implemented as a combination of hardware such as a known digital signal processor (DSP) and software for image processing.

The interface unit 230 outputs image data generated by the image processing unit 220 to a recording medium (not shown) or a display unit (not shown).

Although the imaging device 1000 according to Embodiment 2 may further include known constituent elements such as an electronic shutter, a viewfinder, a power source (battery), a flash lamp, and so on, description thereof is not necessary for understanding of the imaging device 1000 according to Embodiment 2 and is therefore omitted.

The imaging device 1000 need not include the two imaging units as shown in FIG. 4. For example, the imaging device 1000 may include a single movable imaging unit. In this case, the single imaging unit creates a stereogram.

(Functional Configuration of Image Processing Unit)

Hereinafter, creating of a depth map by the image processing unit 220 will be described.

Figure 5:
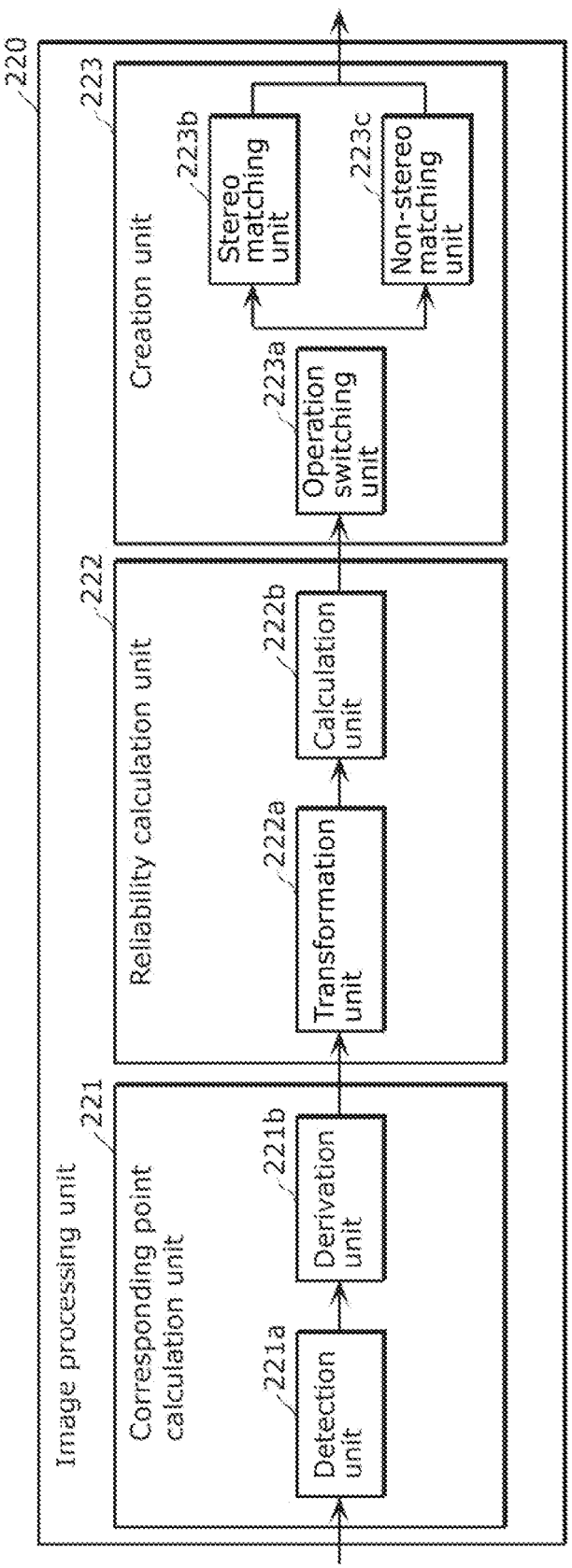
FIG. 5 is a block diagram illustrating a functional configuration of an image processing unit according to Embodiment 2.

FIG. 5 is a block diagram illustrating a functional configuration of the image processing unit 220 according to Embodiment 2. More specifically, FIG. 5 illustrates a functional configuration for creating a depth map. The image processing unit 220 includes a corresponding point calculation unit 221, a reliability calculation unit 222, and a creation unit 223.

The corresponding point calculation unit 221 derives, as corresponding points, a pair of features corresponding to each other between a left image and a right image included in a stereogram. The corresponding point calculation unit 221 includes a detection unit 221a and a derivation unit 221b.

The detection unit 221a detects a plurality of features in a left image and a plurality of features in a right image. More specifically, the detection unit 221a detects a plurality of features in each of the left image and the right image by performing edge detection or corner detection, for example.

The derivation unit 221b derives, as corresponding points, a pair of features corresponding to each other between the left image and the right image. More specifically, the derivation unit 221b derives corresponding points by locating, for each feature in a left image, a feature in a right image having a similar feature quantity to the feature quantity of the feature in the left image, for example, In preparation for creating a depth map, the reliability calculation unit 222 calculates, based on the derived corresponding points, reliability of a correspondence between a left image and a right image. The reliability calculation unit 222 includes a transformation unit 222a and a calculation unit 222b.

The transformation unit 222a performs rectification on a stereogram to parallelize epipolar lines of a stereogram. More specifically, the transformation unit 222a rectifies a stereogram by performing coordinate transformation on at least one of a left image or a right image so that the epipolar lines of the left image and the right image become parallel.

Furthermore, the transformation unit 222a performs projective transformation (homography). More specifically, the transformation unit 222a calculates, using at least four derived corresponding points, a transformation parameter for performing projective transformation of one of a left image and a right image (first image) into the other (second image). Then, the transformation unit 222a transforms the first image using the calculated transformation parameter.

The transformation unit 222a may not rectify a stereogram. For example, such rectification of a stereogram is not necessary when the imaging unit 100a and the imaging unit 100b are appropriately disposed so as to create a stereogram having parallel epipolar lines.

The calculation unit 222b calculates reliability. The reliability is higher when a first image resulting transformation has a smaller error with respect to a second image.

When the calculated reliability is a first reliability, the creation unit 223 creates a depth map using a correspondence between a left image and a right imager. When the calculated reliability is a second reliability which is lower than the first reliability, the creation unit 223 creates a depth map without using a correspondence between a left image and a right image. The creation unit 223 includes an operation switching unit 223a, a stereo matching unit 223b, and a non-stereo matching 223c.

The operation switching unit 223a switchably determines whether the stereo matching unit 223b creates a depth map or the non-stereo matching unit 223c creates a depth map. More specifically, when the reliability is a first reliability, the operation switching unit 223a causes the stereo matching unit 223b to create a depth map. When the reliability is a second reliability, the operation switching unit 223a causes the non-stereo matching unit 223c to create a depth map.

The stereo matching unit 223b creates a depth map using a correspondence between a left image and a right image. More specifically, the stereo matching unit 223b creates a depth map by, for example, calculating disparity between a left image and a right image based on similarity between local regions.

The non-stereo matching unit 223c creates a depth map without using a correspondence between a left image and a right image. More specifically, the non-stereo matching unit 223c creates a depth map by estimating depth using at least one of geometric information, color information, or information on a motion of an object in one of a left image and a right image.

(Processing Operation of Image Processing Unit 220)

Hereinafter, operations of the image processing unit 220 in the above-described configuration will be described. Assume that a left image is a first image and a right image is a second image.

Figure 6:
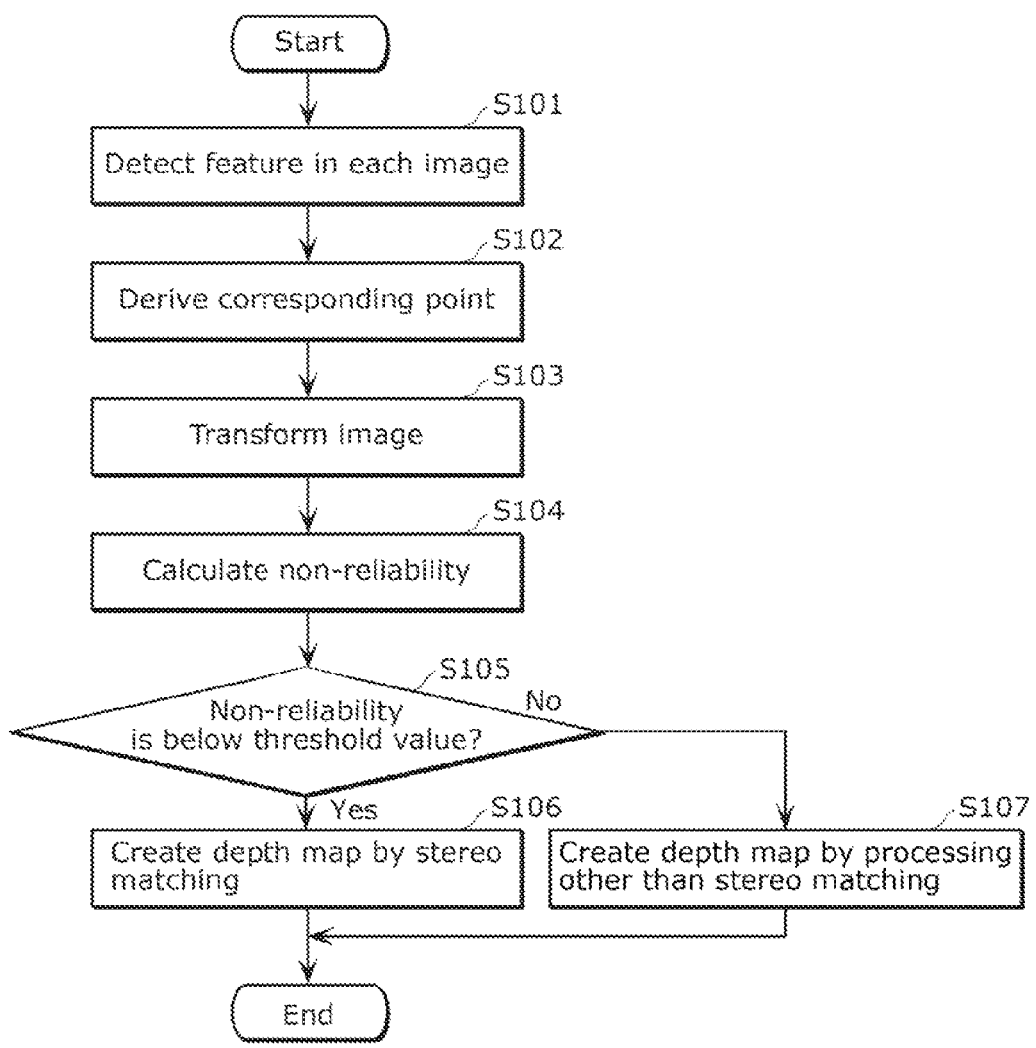
FIG. 6 is a flowchart illustrating processing for creating a depth map performed by the image processing unit according to Embodiment 2.

FIG. 6 is a flowchart illustrating processing for creating a depth map performed by the image processing unit 220 according to Embodiment 2.

First, the detection unit 221a detects a plurality of features in each of the left image and the right image (S101). In this case, the detection unit 221a detects features by performing scale invariant feature transform (SIFT) or speeded up robust features (SURF) (see NPL 3 for an example).

The derivation unit 221b derives, as corresponding points, a pair of features corresponding to each other between the left image and the right image (S102). More specifically, the derivation unit 221b derives corresponding points based on, for example, similarity in the feature quantity of the features. Alternatively, for example, the derivation unit 221b may derive corresponding points based on similarity in pixel value patterns in local regions including features.

The transformation unit 222a aligns the left image and the right image (S103). More specifically, the transformation unit 222a performs rectification and projective transformation on a stereogram. The rectification and projective transformation of a stereogram will be described in detail later.

In preparation for creating a depth map, the calculation unit 222b calculates, based on the corresponding points, reliability of a correspondence between the left image and the right image (S104). More specifically, the reliability calculated by the calculation unit 222b is higher when the first image after being transformed has a smaller error with respect to the second image.

In Embodiment 2, the reliability calculated by the calculation unit 222b has a smaller value to indicate a higher reliability. Hereinafter, the reliability having a smaller value to indicate a higher reliability will be referred to as non-reliability to be distinguishable from reliability having a larger value to indicate a higher reliability.

The operation switching unit 223a determines whether or not the calculated non-reliability is below a threshold value (S105). In other words, the operation switching unit 223a determines whether or not the reliability is a first reliability.

When the operation switching unit 223a determines that the non-reliability is below a threshold value (S105, Yes), the stereo matching unit 223b creates a depth map by performing stereo matching on the left image and right image after being rectified (S106). The stereo matching is processing for deriving a correspondence between a left image and a right image. More specifically, stereo matching is performed using a method in which a local search window is used or a method in which a global energy function is used (for example, graph cuts or belief propagation). The stereo matching will be described in detail later.

When the operation switching unit 223a determines that the non-reliability is not below a threshold value (S105, No), the non-stereo matching unit 223c creates a depth map by performing processing other than the stereo matching (S107). The processing other than the stereo matching is processing in which a correspondence between a left image and a right image is not used.

More specifically, the processing other than the stereo matching is performed by, for example, estimating depth from characteristics of one of a left image and a right image (this is what is called 2D-3D transformation, which is processing for generating pseudo-depth information). Generally, a feeling of depth given to an image by pseudo-depth information is weak. However, even when an accurate depth map cannot be created for an image of a scene by matching, it is still possible to create a depth map such that the image processed using the depth map is logical.

Hereinafter, the steps in FIG. 6 will be described in detail.

First, Step S103 will be detailed. In Step S103, rectification and projective transformation are performed on a stereogram. The following describes the rectification of a stereogram, A stereogram (a left image and right image) captured by a stereo camera is usually not parallel. In view of this, first, the transformation unit 222a rectifies a stereogram to parallelize epipolar lines in the stereogram. In Embodiment 2, the transformation unit 222a rectifies a stereogram using a method described in NPL 1.

Figure 7:
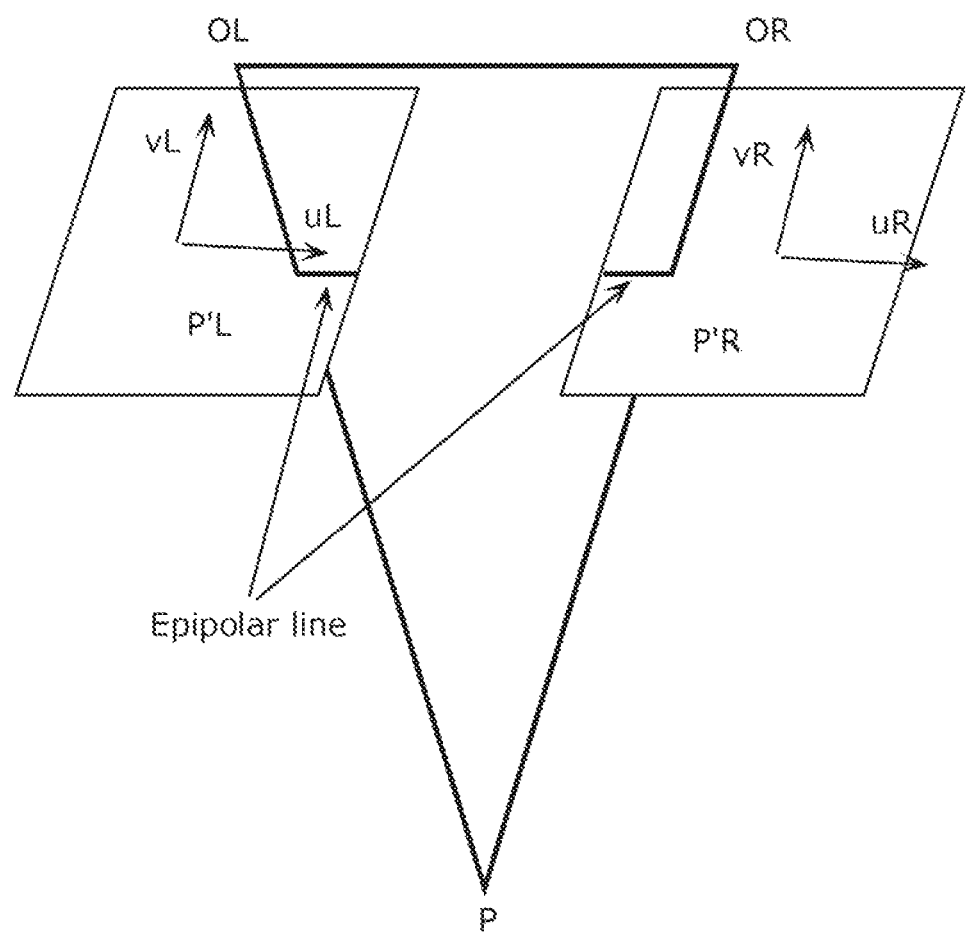
FIG. 7 illustrates rectification of a stereogram in Embodiment 2.

FIG. 7 illustrates rectification of a stereogram in Embodiment 2. FIG. 7 shows a left image and a right image of an object P. A point P'R on a right image, which corresponds to a point P'L on a left image, is on a line of intersection of a projection plane of the right image and a plane containing the center of projection OL of the left image, the center of projection OR of the right image, and the point P'L thereon.

This line is called an epipolar line. The plane containing the object P, the center of projection OL of the left image, and the center of projection OR of the right image are is called an epipolar plane. In other words, the lines of intersection between the epipolar plane and the left image and the right image are epipolar lines.

In a stereogram yet to be rectified, epipolar lines do not coincide with scanning lines of images. Accordingly, matching of such a stereogram yet to be rectified involves two-dimensional search, so that complexity of the matching is high. In view of this, the transformation unit 222a in Embodiment 2 rectifies a stereogram using a method shown below to simplify the searching.

First, the transformation unit 222a sets a coordinates system of (x', y', z') having an origin at the center of projection OL of a left image and an x' axis and a y' axis parallel to a uL axis and a vL axis, respectively. The coordinate system of (x', y', z') is referred to as a model coordinate system.

In the model coordinate system, the center of projection OL of the sensor for the left image is positioned at (0, 0, 0), and the orientation of the sensor for the left image is represented as (0, 0, 0) The center of projection OR of the sensor for the right image is positioned at (Bx', By', Bz'), and the orientation of the sensor for the right image is represented as ($\omega'$, $\phi'$, $\chi'$). Bx' is defined as a unit length, by' is defined as By'/Bx', and bz' is defined as Bz'/Bx'. Then, coordinate transformation between the model coordinate system and a coordinate system of each imaginary plane of projection are represented as Equation (1) and Equation (2) shown below, respectively.

[EQ. 1]

$$\begin{bmatrix} x'L \\ y'L \\ z'L \end{bmatrix} = \begin{bmatrix} uL \\ vL \\ -cL \end{bmatrix} \quad (1)$$

[EQ. 2]

$$\begin{bmatrix} x'R \\ y'R \\ z'R \end{bmatrix} = \begin{bmatrix} 1 & 0 & 0 \\ 0 & \cos\omega' & -\sin\omega' \\ 0 & \sin\omega' & \cos\omega' \end{bmatrix} \begin{bmatrix} \cos\phi' & 0 & \sin\phi' \\ 0 & 1 & 0 \\ -\sin\phi & 0 & \cos\phi' \end{bmatrix} \quad (2)$$

$$\begin{bmatrix} \cos\chi' & -\sin\chi' & 0 \\ \sin\chi' & \cos\chi' & 0 \\ 0 & 0 & 1 \end{bmatrix} \begin{bmatrix} uR \\ vR \\ -cR \end{bmatrix} \begin{bmatrix} 1 \\ by' \\ bz' \end{bmatrix}$$

The equation for coordinate transformation includes five unknowns of (by', bz') and ($\omega'$, $\phi'$, $\chi'$), which relate to the right image. These five unknowns are determined so as to satisfy Equation (3) of co-planarity condition shown below.

[EQ. 3]

$$\begin{vmatrix} 1 & by' & bz' \\ x'L & y'L & z'L \\ x'R & y'R & z'R \end{vmatrix} \quad (3)$$

Then, the transformation unit 222a determines an imaginary plane of projection using five or more corresponding points derived by the derivation unit 221b. Next, the transformation unit 222a determines (by', bz') and ($\omega'$, $\phi'$, $\chi'$) by applying a least square method to Equation (3) using the determined imaginary plane of projection.

Next, the transformation unit 222a rectifies the stereogram by performing coordinate transformation on the left image L (uL, vL) and the right image R (uR, vR) according to Equation (4) and Equation (5) shown below.

[EQ. 4]

$$\begin{bmatrix} u'L \\ v'L \end{bmatrix} = \begin{bmatrix} x'L \\ y'L \end{bmatrix} \quad (4)$$

$$= \begin{bmatrix} uL \\ vL \end{bmatrix}$$

[EQ. 5]

$$\begin{bmatrix} u'R \\ v'R \end{bmatrix} = \frac{cL}{z'R - bz'} \begin{bmatrix} x'R - 1 \\ y'R - by' \end{bmatrix} \quad (5)$$

The left image L' (u'L, v'L) and the right image R' (u'R, v'R) resulting from the coordinate transformation are aligned along the epipolar lines. Corresponding pixels in the left image L and the right image R have the same value for the vertical coordinates (v'L=v'R). This means that in matching performed on the two images, a search range extends only along a horizontal scanning line. Thus, rectification of a stereogram can reduce load of matching.

The rectification is not limited to the above-described manner in which projection to be performed is assumed to be central projection. The rectification may also be performed using a geometric mode suitable for an imaging system in the case of perspective projection or weak perspective projection.

The following describes projective transformation. The transformation unit 222a calculates, using at least four derived corresponding points, a transformation parameter for performing projective transformation of a first image into a second image. Then, the transformation unit 222a transforms the first image using the calculated transformation parameter.

Figure 8:
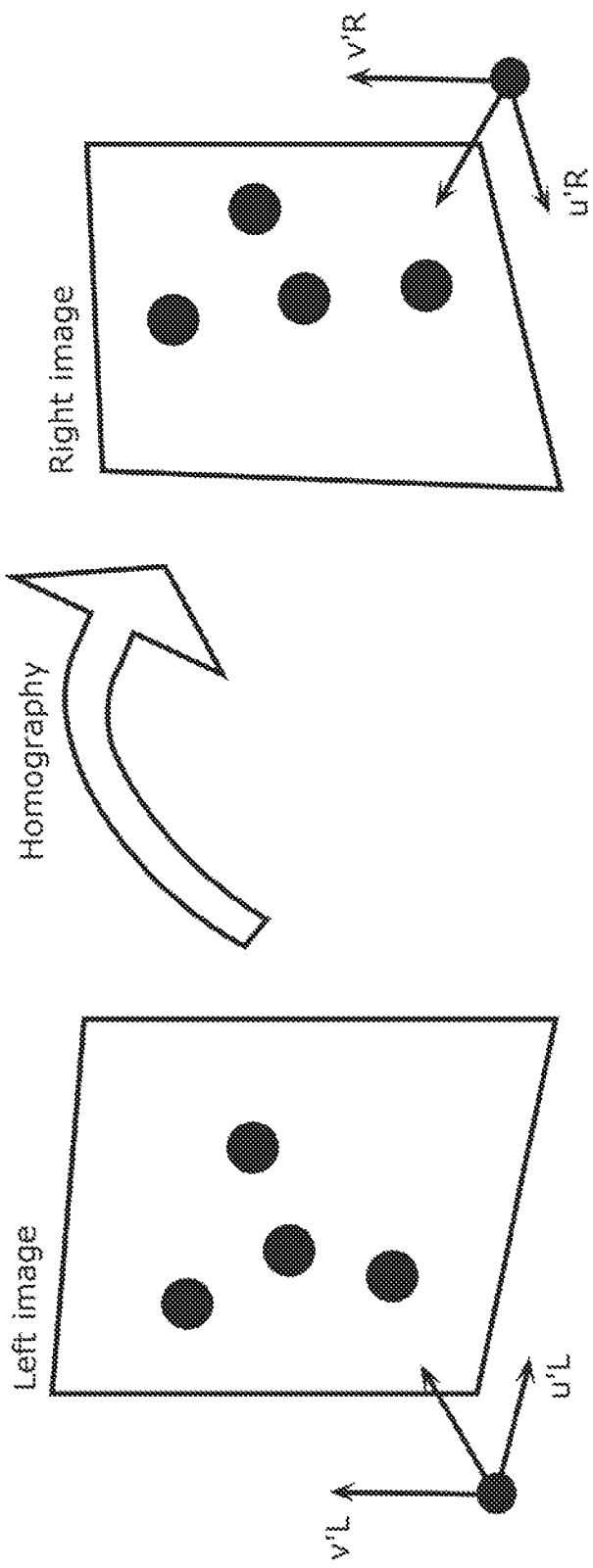
FIG. 8 illustrates projective transformation in Embodiment 2.

FIG. 8 illustrates projective transformation in Embodiment 2. In Embodiment 2, the transformation unit 222a calculates, as a transformation parameter, a projective transformation matrix (homography matrix) to perform projective transformation of a left image (first image) into a rectified right image (second image). The projective transformation matrix H satisfies Equation (6) shown below.

[EQ. 6]

$$\begin{bmatrix} u'R \\ v'R \\ 1 \end{bmatrix} = H \begin{bmatrix} u'L \\ v'L \\ 1 \end{bmatrix} \quad (6)$$

$$H = \begin{bmatrix} h_{11} & h_{12} & h_{13} \\ h_{21} & h_{22} & h_{23} \\ h_{31} & h_{32} & h_{33} \end{bmatrix}$$

The transformation unit 222a calculates the projective transformation matrix H by solving a system of equations obtained by assigning the at least four corresponding points. Then, the transformation unit 222a transforms the left image using the calculated projective transformation matrix thus obtained.

In Embodiment 2, the transformation unit 222a calculates plural projective transformation matrices using plural different combinations of M (4≤M<N) corresponding points selected from among N (N≥5) derived corresponding points. Then, the transformation unit 222a transforms the first image into plural transformed first images using the projective transformation matrices.

More specifically, the transformation unit 222a makes K (K≥2) combinations of M corresponding points selected from among the derived N corresponding points. The K combinations of M corresponding points are mutually different combinations of M corresponding points. It should be noted that the NI corresponding points in the respective K combinations need not be totally different between the combinations. In other words, the K combinations of the M corresponding points may share part of corresponding points.

Next, the transformation unit 222a calculates K projective transformation matrices Hk (1≤k≤K) using the selected K combinations of M corresponding points. Then, the transformation unit 222a transforms the left image L' into K transformed left images L'k using the K projective transformation matrices Hk.

First, Step S104 will be detailed.

Generally, a corresponding point has error. When a projective transformation matrix is calculated using a corresponding point having a smaller error, a left image transformed using the projective transformation matrix has a smaller error with respect to a right image. In other words, the higher the reliability of a corresponding point, the smaller the error of a transformed left image with respect to a right image.

Furthermore, reliability of a correspondence between a left image and a right image depends on reliability of corresponding points. In other words, the higher the reliability of corresponding points, the higher the reliability of a correspondence between a left image and a right image.

The calculation unit 222b calculates reliability to be higher for a smaller error of a left image transformed using a projective transformation matrix with respect to a right image. In other words, the calculation unit 222b calculates non-reliability to be higher for a larger error of the transformed left image with respect to the right image.

More specifically, the calculation unit 222b calculates reliability so that the reliability increases as any of a root mean square, an average absolute value, a square sum, and an absolute value sum of errors of K transformed left image L'k with respect to a right image R' decreases. In other words, the calculation unit 222b calculates non-reliability so that the non-reliability increases as any of a root mean square, an average absolute value, a square sum, and a sum of absolute values of errors of K transformed left image L'k with respect to a right image R' increases.

The following describes a concrete example of reliability calculation in Embodiment 2. First, the calculation unit 222b obtains a right image R' rectified using N corresponding points. Next, the calculation unit 222b transforms a left image L' into K transformed left images L'k using K projective transformation matrices Hk calculated from respective K combinations of M corresponding points. Then, the calculation unit 222b calculates, as an error, a root mean square, an average absolute value, a square sum, and an absolute value sum of differences of the K transformed left images L'k from the right image R'.

More specifically, the calculation unit 222b calculates a non-reliability Conf by averaging an absolute value sum of differences in pixel values between the K transformed left images L'k and the right image R' by the number of images and the number of pixels as represented by Equation (7), pix in Equation (7) denotes the number of pixels per image.

[EQ. 7]

$$Conf = \frac{1}{K * pix} \sum_{k=1}^{K} \sum_{x,y} |R'(x, y) - L'k(x, y)| \quad (7)$$

The non-reliability thus calculated represents how low the reliability of a correspondence between a left image and a right image included in a stereogram.

Next, Step S106 will be detailed. In Step S106, the stereo matching unit 223b creates a depth map by calculating disparity between a left image and a right image using a correspondence between the left image and the right image.

More specifically, the stereo matching unit 223b calculates disparity between a left image and a right image based on, for example, similarity of local regions. In other words, the stereo matching unit 223b calculates disparity by, for example, performing block matching.

Figure 9:
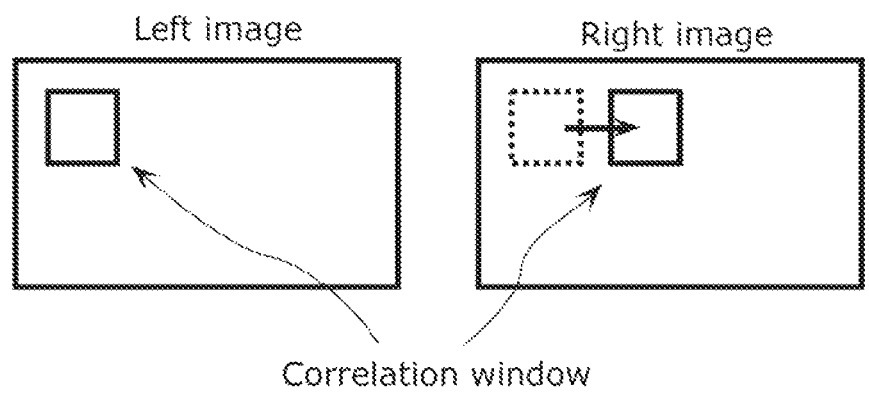
FIG. 9 illustrates matching in Embodiment 2.

More specifically, the stereo matching unit 223b sets a correlation window in a left image included in a rectified stereogram as shown in FIG. 9. Then, the stereo matching unit 223b locates a position of a correlation window having a pixel value pattern most similar to the pixel value pattern of the correlation window in the left image in a right image included in the rectified stereogram by scanning the right image with a correlation window in a horizontal direction from a position equivalent to the position of the correlation window in the left image. A disparity is obtained by obtaining a difference (in the number of pixels, for example) in the horizontal direction between a representative pixel (for example, a center pixel) of the correlation window at the position thus located in the right image and a representative pixel of the correlation window of the left image, The similarity between pixel value patterns is determined using, for example, a sum of absolute differences (SAD), a sum of squared differences (SW) or a normalized correlation (NCOR). For example, when the pixel in the lower left corner of a correlation window is at (x, y) and the size of the correlation window is Bi×Bj, a SAD is calculated as represented by Equation (8).

[EQ. 8]

$$SAD = \sum_{i=1}^{Bi} \sum_{j=1}^{Bj} |L(x+i, y+j) - R(x'+i, y+j)| \quad (8)$$

In Equation (8), L(x+y+j) denotes the pixel value of a pixel (x+y+j) in the left image, and R(x'+i, y+j) denotes the pixel value of a pixel (x'+i, y+j) in the right image. The smaller the sum of absolute differences (SAD) between pixel values of a correlation window in a left image and pixel values of a correlation window in a right image, the higher the similarity between the correlation window in the left image and the correlation window in the right image. Accordingly, the stereo matching unit 223b calculates a disparity d of a representative pixel of a correlation window in the left image by locating a position of a correlation window having the smallest SAD in the right image.

A disparity is calculated for each pixel in the left image, so that a parallax map (depth map) is obtained. Such a method of creating a depth map to be performed by the stereo matching unit 223b is also disclosed in PTL 1 and PTL 2 and therefore further details of the method are not described.

The method of creating a depth map to be performed by the stereo matching unit 223b is not limited to the above description. For example, the stereo matching unit 223b may determine similarity between local regions using feature quantity instead of pixel value patterns.

Alternatively, for example, the stereo matching unit 223b may calculate disparity for each pixel based on global similarity in features. More specifically, the stereo matching unit 223b may create a depth map based on, for example, both similarity between local regions and spatial smoothness of disparity distribution. More specifically, the stereo matching unit 223b may create a depth map using, for example, a method disclosed in PTL 3. More specifically, the stereo matching unit 223b may create a depth map using disparities calculated based on similarity between local regions and spatial smoothness of disparity distribution. Alternatively, for example, the stereo matching unit 223b may create a depth neap using, for example, a method disclosed in NPL 4.

Next, Step S107 will be detailed. In Step S107, the non-stereo matching unit 223c creates a depth map by estimating depth using only one of a left image and a right image.

More specifically, the non-stereo matching unit 223c creates a depth map by estimating depth using an analysis of an imaged scene (for example, an analysis of at least one of geometric information, color information, or information on a motion of an object). Since the non-stereo matching unit 223c does not calculate disparity by matching two images, this method enables creation of a depth map even for a scene for which features are difficult to calculate.

The estimation of depth is what is called 2D-3D conversion. More specifically, three-dimensional depth is estimated from a two-dimensional image using information which a human utilizes to perceive depth except binocular disparity. Examples of information utilized for perception of depth include blur in an image, motion information, and previous knowledge about a typical scene.

For example, in an image taken using a camera with a large aperture such as a single-lens reflex camera, the focus is placed on a main object and the background is out of focus. The non-stereo matching unit 223c may analyze an in-focus degree for each pixel in an image and create a depth map based on the analysis.

In an image, an apparent motion amount of an object moving at a given speed is smaller when the object is more distant, and is larger when the object is closer. The non-stereo matching unit 223c therefore may estimate distances utilizing information on a motion amount of an object to create a depth map.

To give another example, in an image of a sea view, a more distant point of the sea has a thicker blue color above the center of the image, and a closer point of the sea, or a lower point of the image, has a paler blue color. In this manner, a scene may have a correlation between colors and depths specific to a situation of the scene. The non-stereo matching unit 223c therefore may estimate depth of an input image of a scene by comparing the image with a preloaded template indicating a color arrangement and depth of a typical scene to create a depth map.

To give another example, the non-stereo matching unit 223c may perform face recognition on an image and estimate depth of the image based on the region size of the recognized face. To give another example, the non-stereo matching unit 223c may detect a vanishing point and estimate depth based on the vanishing point, Thus, the non-stereo matching unit 223c estimates a depth map from a single two-dimensional image without using a correspondence between a left image and a right image. It is difficult for the non-stereo matching unit 223c to create a highly accurate depth map because the non-stereo matching unit 223c uses information only on a left image or a right image. However, the non-stereo matching unit 223c is still capable of preventing significant deterioration in accuracy of a resulting depth map even when a left image and a right image have few features.

The non-stereo matching unit 223c may estimate create a depth map using a method other than the above-described methods. For example, when stereograms are consecutively input (that is when a stereo moving picture is input), the non-stereo matching unit 223c may create a depth map for a stereogram using a depth map created using a temporally different stereogram.

To give another specific example, when an instant camera shake is detected in an output from a gyroscope, the non-stereo matching unit 223c may create a depth map for a current stereogram by performing interpolation using two depth maps created from stereograms of frames temporally preceding and following the current stereogram. By doing this, the non-stereo matching unit 223c can avoid an acute change between depth maps for different time points, so that the images processed using the depth maps looks rather normal. In this manner, the non-stereo matching unit 223c creates a more natural depth map using a depth map obtained from a temporally different stereogram.

To give another example, the non-stereo matching unit 223c may create a depth map for a current stereogram using at least one of a depth map already created by either the stereo matching unit 223b or the non-stereo matching unit 223c using a preceding stereogram or depth estimated by the non-stereo matching unit 223c using the current stereogram. To give another specific example, the non-stereo matching unit 223c may create a depth map for a current stereogram using both a depth map already created by the stereo matching unit 223b using another stereogram and depth estimated by the non-stereo matching unit 223c using the current stereogram. To be more specific, the non-stereo matching unit 223c may create a depth map for a current stereogram using a statistical representative value (for example, an arithmetic mean value or a weighted average value) estimated using a depth indicated by a depth map created using another stereogram and depth estimated using the current stereogram. By doing this, the non-stereo matching unit 223c can create a depth map having increased accuracy without using a correspondence between a left image and a right image.

To give another example, the non-stereo matching unit 223c may use, as a depth map for a current stereogram, a depth map already created by the stereo matching unit 223b using another stereogram. By doing this, the non-stereo matching unit 223c can easily create a depth map.

As described above, the image processing unit 220 according to Embodiment 2 is capable of creating depth maps for scenes of any type using appropriate methods. For example, the image processing unit 220 can create a depth map for a scene without performing stereo matching, which is generally considered as a process requiring heavy load, when stereo matching is difficult for the scene. Thus, the image processing unit 220 consumes less power. Furthermore, a depth map created for a scene by stereo matching has low accuracy when stereo matching is difficult for the scene. Viewers who view an image processed using such a depth map will find the image unnatural or feel uncomfortable. The image processing unit 220 can prevent large drop in accuracy of depth maps by creating a depth map for a scene without performing stereo matching when stereo matching is difficult for the scene.

Furthermore, the image processing unit 220 according to Embodiment 2 can calculate, using at least four corresponding points, a transformation parameter for performing projective transformation of a first image into a second image. Then, the image processing unit 220 can calculate reliability based on an error of the first image transformed using the transformation parameter thus calculated with respect to the second image. When derived corresponding points are correct, the error of the transformed first image with respect to the second image is small. Thus, the image processing unit 22 can calculate reliability more appropriately, so that significant deterioration in accuracy of a depth map is further prevented.

Furthermore, the image processing unit 220 according to Embodiment 2 can obtain a plurality of transformed first images using K combinations of M corresponding points. Then, the image processing unit 220 can calculate reliability using the plurality of transformed first images. Thus, the image processing unit 22 can stably calculate reliability, so that significant deterioration in accuracy of a depth map is further prevented.

Each of the above-described methods according to Embodiment 2 used to create a depth map using a stereogram is applicable also to creation of a depth map for an input multi-view mage including two or more images. For example, a depth map may be created using any two images included in the multi-view images.

Furthermore, in Embodiment 2, the calculation unit 222b may calculate the non-reliability using a single transformed first image instead of using a plurality of transformed first images as represented by Equation (7). In this case, the transformation unit 222a may calculate a projective transformation matrix using one combination of M corresponding points or one combination of N corresponding points.

Furthermore, in Embodiment 2, the calculation unit 222b may calculate an error from a part of a second image instead of the whole of the second region as represented by Equation (7). For example, the calculation unit 222b may calculate an error of a transformed first image with respect to a second image, only from a region where a detected edge has a strength above a threshold value in the second image. By doing this, the calculation unit 222b can calculate an error only from the region including a strong edge. A correspondence between images can be obtained more easily in such a region including a strong edge. Accordingly, the calculation unit 222b can calculate reliability for a region for which unfailing obtainment of a correspondence is desired, even with a smaller load.

Furthermore, in Embodiment 2, the calculation unit 222b may calculate reliability based on similarity between two features included in corresponding points instead of an error of a first image resulting from projective transformation with respect to a second image. More specifically, the calculation unit 222b may calculate reliability to be higher for a higher similarity between two features included in corresponding points. In other words, the calculation unit 222b may calculate reliability based on the corresponding points. Also in this case, reliability of a correspondence between images depends on accuracy of corresponding points, and therefore reliability can be appropriately calculated. When reliability is calculated based on similarity between two features, the reliability calculation unit 222 need not include the transformation unit 222a.

Furthermore, in Embodiment 2, the image processing unit included in the imaging device need not be included in the image processing device. In other words, the image processing unit may be implemented as an image processing device as in Embodiment 1.

The present invention is not limited to the above-described embodiments, which are used for description of the image processing device or the imaging device according to one or more aspect of the present invention. Variations of the embodiments which would occur to those skilled in the art and embodiments in which the constituent elements in the present embodiments or the variations thereof are also within the scope of the one or more of the aspects of the present invention.

For example, in the above-described embodiments, each of the constituent elements may be implemented as a piece of dedicated hardware or implemented by executing a software program appropriate for the constituent element. The constituent elements may be implemented by a program execution unit such as a CPU or a processor which reads and executes a software program recorded on a recording medium such as a hard disk or a semiconductor memory. The image decoding device in the above-described embodiments is implemented by executing a software program below, The program causes a computer to execute an image processing method for creating a depth map using a multi-view image, and the method includes: detecting one or more features in each of images included in the multi-view image; calculating, based on the detected features, reliability of a correspondence between the images included in the multi-view image in preparation for creating the depth map; and creating the depth map using the correspondence between the images included in the multi-view image when the calculated reliability is a first reliability, and create the depth map without using the correspondence between the images included in the multi-view image when the calculated reliability is a second reliability which is lower than the first reliability.

(Variations)

The present invention is not limited to the above-described embodiments which are used for the description of the present invention. The following variations are also within the scope of the present invention, (1) Specifically, the above-described image processing device or image processing unit is a computer system including a microprocessor, ROM, RAM, a hard disk unit, a display unit, a keyboard, a mouse. The ROM or hard disk unit stores a computer program. The microprocessor operates according to the computer program so that the image processing device or image processing unit performs its functions. Here, the computer program includes a combination of instruction codes to indicate instructions to the computer so that the computer performs predetermined functions.

(2) All or part of the constituent elements included in the above-described image processing device or image processing unit may be implemented as a system large scale integration (LSI). The system LSI is a super-multifunctional LSI manufactured by integrating constituent units on one chip, and is specifically a computer system including a microprocessor, ROM, and RAM. The RAM stores a computer program. The microprocessor operates according to the computer program, so that the system LSI performs its functions.

(3) All or part of the constituent elements included in the above-described image processing device or image processing unit may be implemented as an IC card or a unit of a module attachable to the imaging device. Each of the IC card and the module is a computer system including components such as a microprocessor, ROM, and RAM. Each of the IC card and the module may include the super-multifunctional LSI. The microprocessor operates according to the computer program, so that the IC card or the module can perform its functions. The IC card and the module may be tamper-proofed.

(4) The present invention may be implemented as a method. In addition, the present invention may be implemented as a computer program which performs the method using a computer or as a digital signal containing a computer program.

In addition, the present invention may be implemented as a computer program or a digital signal recorded on a computer-readable recording medium such as a flexible disk, a hard disk, a CD-ROM, an MO, a DVD, a DVD-ROM, a DVD-RAM, a Blu-ray Disc (BD), or semiconductor memory. The present invention may be a digital signal recorded on any of the recording media.

In addition, the present invention may be implemented as a computer program or a digital signal transmitted through an electric communication line, a wireless or wired communication line, a network typified by the Internet, data broadcasting, or the like.

In addition, the present invention may be implemented as a computer system including a microprocessor and a memory. The memory stores the computer program and the microprocessor operates according to the computer program.

The program or the digital signal may be recorded on a recording medium for transportation or transmitted through a network or the like so that the program is executed on another independent computer system.

(5) The present invention may be implemented as any combination of the above-described embodiments and variations.

INDUSTRIAL APPLICABILITY

The three-dimensional imaging device according to the present invention is applicable to all cameras including a solid-state imaging device. For example, the three-dimensional imaging device according to the present invention can be used as a consumer camera such as a digital still camera or digital video camera and as an industrial camera such as a surveillance camera.

REFERENCE SIGNS LIST

10 Image processing device
11, 221a Detection unit
12, 222b Calculation unit
13, 223 Creation unit
20, 1000 Imaging device
100a, 100b Imaging unit
101 Imaging device
102 Light-transmissive plate
103 Optical lens
104 Infrared cut filter
105 Signal generator-receiver
106 Device driver unit
200 Signal processing unit
210 Memory
220 Image processing unit
221 Corresponding point calculation unit
221b Derivation unit
222 Reliability calculation
222a Transformation unit
223a Operation switching unit
223b Stereo matching unit
223c Non-stereo matching unit
230 Interface (IF) unit

The invention claimed is:

1. An image processing device which creates a depth map using a multi-view image, the image processing device comprising:

a detection unit configured to detect one or more features in each of images included in the multi-view image, by performing edge detection or corner detection on the multi-view image;

a derivation unit configured to derive, as corresponding points, a pair of the features corresponding to each other between the images included in the multi-view image, based on similarity in feature quantity of the detected features;

a calculation unit configured to calculate, based on the derived corresponding points, a reliability of a correspondence between the images included in the multi-view image in preparation for creating the depth map;

a creation unit configured to create the depth map using the correspondence between the images included in the multi-view image when the calculated reliability is a first reliability, and create the depth map without using the correspondence between the images included in the multi-view image when the calculated reliability is a second reliability which is lower than the first reliability; and a transformation unit configured to calculate, using at least four of the derived corresponding points, a transformation parameter for projective transformation of a first image included in the multi-view image into a second image included in the multi-view image, and transform the first image using the transformation parameter, wherein:

the detection unit is configured to detect an edge as the feature, and the calculation unit is configured to calculate the reliability which is higher when an error of the first image resulting from the projective transformation with respect to the second image is smaller, and calculate the error of the first image resulting from the projective transformation with respect to the second image, by calculating a difference in pixel values only from a region where the detected edge has a strength above a threshold value in the second image.

2. The image processing device according to claim 1, wherein the transformation unit is configured to calculate plural transformation parameters using plural combinations of M corresponding points selected from among N of the derived corresponding points, and transform the first image into plural first images resulting from the projective transformation using the plural transformation parameters, where $N \geq 5$ and $4 \leq M \leq N$, the combinations being different from each other, and wherein the calculation unit is configured to calculate, as the error, one of a root mean square, an average absolute value, a square sum, and a sum of absolute values of differences between the plural transformed first images and the second image, and calculate the reliability which is higher when the error is smaller.

3. The image processing device according to claim 1, wherein when the calculated reliability is the first reliability, the creation unit is configured to create the depth map by calculating disparity between the images included in the multi-view image, based on similarity between local regions.

4. The image processing device according to claim 1, wherein when the calculated reliability is the second reliability, the creation unit is configured to create the depth map by estimating depth using at least one of geometric information, color information, and information on a motion of an object in one of the images included in the multi-view image.

5. The image processing device according to claim 1, wherein the multi-view image is included in a multi-view video, and when the calculated reliability is the second reliability, the creation unit is configured to create the depth map for the multi-view image using a depth map created using an other multi-view image which is included in the multi-view video and temporally different from the multi-view image.

6. The image processing device according to claim 5, wherein when the calculated reliability is the second reliability, the creation unit is configured to create the depth map using both a depth map created using a correspondence between local regions in the other multi-view image and depth estimated using at least one of geometric information, color information, and information on a motion of an object in one of the images included in the multi-view image.

7. The image processing device according to claim 5, wherein when the calculated reliability is the second reliability, the creation unit is configured to use, as the depth map for the multi-view image, a depth map created using a correspondence between local regions in the other multi-view image.

8. The image processing device according to claim 1, wherein the multi-view image is a stereogram, wherein the transformation unit is further configured to rectify the stereogram to parallelize epipolar lines in the stereogram, and when the calculated reliability is the first reliability, the calculation unit is configured to create the depth map using a correspondence in the rectified stereogram.

9. The image processing device according to claim 1, wherein the image processing device is configured as an integrated circuit.

10. An imaging device comprising:

the image processing device according to claim 1; and an imaging unit configured to capture the multi-view image.

11. An image processing method of creating a depth map using a multi-view image, the image processing method comprising:

detecting one or more features in each of images included in the multi-view image, by performing edge detection or corner detection on the multi-view image;

deriving, as corresponding points, a pair of the features corresponding to each other between the images included in the multi-view image, based on similarity in feature quantity of the detected features;

calculating, based on the derived corresponding points, a reliability of a correspondence between the images included in the multi-view image in preparation for creating the depth map;

creating the depth map using the correspondence between the images included in the multi-view image when the calculated reliability is a first reliability, and creating the depth map without using the correspondence between the images included in the multi-view image when the calculated reliability is a second reliability which is lower than the first reliability;

calculating, using at least four of the derived corresponding points, a transformation parameter for projective transformation of a first image included in the multi-view image into a second image included in the multi-view image; and transforming the first image using the transformation parameter, wherein:

an edge is detected as the feature, and the reliability which is higher when an error of the first image resulting from the projective transformation with respect to the second image is smaller is calculated, and the error of the first image resulting from the projective transformation with respect to the second image is calculated by calculating a difference in pixel values only from a region where the detected edge has a strength above a threshold value in the second image.

12. A non-transitory computer-readable recording medium for use in a computer, the non-transitory computer-readable recording medium having a computer program recorded thereon for causing the computer to execute the image processing method according to claim 11.

* * * * *